United States Patent
Miao et al.

(10) Patent No.: US 11,373,337 B2
(45) Date of Patent: Jun. 28, 2022

(54) IMAGE PROCESSING METHOD OF VIRTUAL REALITY AND APPARATUS THEREOF

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Jinghua Miao, Beijing (CN); Hao Zhang, Beijing (CN); Lili Chen, Beijing (CN); Yukun Sun, Beijing (CN); Yali Liu, Beijing (CN); Xi Li, Beijing (CN); Bin Zhao, Beijing (CN); Xuefeng Wang, Beijing (CN); Lixin Wang, Beijing (CN); Jianwen Suo, Beijing (CN); Wenyu Li, Beijing (CN); Ziqiang Guo, Beijing (CN); Ruifeng Qin, Beijing (CN); Guixin Yan, Beijing (CN); Feng Pan, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 588 days.

(21) Appl. No.: 16/332,113

(22) PCT Filed: Aug. 15, 2018

(86) PCT No.: PCT/CN2018/100679
§ 371 (c)(1),
(2) Date: Mar. 11, 2019

(87) PCT Pub. No.: WO2019/134368
PCT Pub. Date: Jul. 11, 2019

(65) Prior Publication Data
US 2021/0327093 A1    Oct. 21, 2021

(30) Foreign Application Priority Data
Jan. 2, 2018 (CN) .......................... 201810001593.1

(51) Int. Cl.
*G06T 9/00* (2006.01)
*G06F 3/01* (2006.01)
(Continued)

(52) U.S. Cl.
CPC ................ *G06T 9/00* (2013.01); *G06F 3/013* (2013.01); *G06T 3/40* (2013.01); *G06T 5/006* (2013.01)

(58) Field of Classification Search
CPC .................................. G06T 5/006; G06T 9/00
See application file for complete search history.

(56) References Cited

U.S. PATENT DOCUMENTS

2004/0120606 A1* 6/2004 Fredlund ............ H04N 5/23222
                                                    382/218
2010/0103077 A1* 4/2010 Sugiyama .......... G02B 27/0172
                                                    345/8
(Continued)

FOREIGN PATENT DOCUMENTS

CN    104735464 A    6/2015
CN    106935224 A    7/2017
(Continued)

OTHER PUBLICATIONS

Office Action dated Apr. 25, 2019, issued in counterpart CN Application No. 201810001593.1, with English translation. (12 pages).
(Continued)

*Primary Examiner* — Phi Hoang
(74) *Attorney, Agent, or Firm* — WHDA, LLP

(57) ABSTRACT

The present disclosure is related to an image processing method of virtual reality. The image processing method may include obtaining position information of a gaze point; performing a compression process on an original image to obtain a compressed image based on the position information of the gaze point; performing a compression process on a distorted image of the original image in an lens to obtain
(Continued)

a compressed distorted image based on the position information of the gaze point; and performing an anti-distortion process on the compressed image to obtain an anti-distortion image based on a relationship between the compressed image and the compressed distorted image. The position information of the gaze point may be position information of a gaze point of a user's eye on an original image.

15 Claims, 11 Drawing Sheets

(51) Int. Cl.
*G06T 3/40* (2006.01)
*G06T 5/00* (2006.01)

(56) References Cited

U.S. PATENT DOCUMENTS

| | | | | |
|---|---|---|---|---|
| 2011/0109535 | A1* | 5/2011 | Watanabe | G02F 1/133526 345/87 |
| 2012/0063678 | A1* | 3/2012 | Asikainen | H04N 19/93 382/165 |
| 2017/0206428 | A1* | 7/2017 | Weiss | G06F 3/0485 |
| 2017/0285736 | A1* | 10/2017 | Young | H04N 19/167 |
| 2018/0032304 | A1* | 2/2018 | Lin | G06F 3/013 |
| 2019/0180672 | A1* | 6/2019 | Knez | G09G 3/2092 |
| 2019/0378305 | A1* | 12/2019 | Fitzgerald | H04N 19/167 |
| 2021/0132688 | A1* | 5/2021 | Kim | G06N 3/08 |

FOREIGN PATENT DOCUMENTS

| | | |
|---|---|---|
| CN | 107040794 A | 8/2017 |
| CN | 107317987 A | 11/2017 |
| CN | 108076384 A | 5/2018 |
| KR | 10-2014-0113066 A | 9/2014 |

OTHER PUBLICATIONS

International Search Report dated Nov. 7, 2018, issued in counterpart International Application No. PCT/CN2018/100679. (10 pages).

* cited by examiner

IMAGE PROCESSING METHOD OF VIRTUAL REALITY AND APPARATUS THEREOF

CROSS-REFERENCE TO RELATED APPLICATIONS

This application claims benefit of the filing date of Chinese Patent Application No. 201810001593.1 filed on Jan. 2, 2018, the disclosure of which is hereby incorporated in its entirety by reference.

TECHNICAL FELD

This disclosure relates to a display technology, in particular, to an image processing method of virtual reality and an apparatus thereof.

BACKGROUND

The development of Virtual Reality (VR) technology requires the display apparatus to have a high resolution and a high refresh rate. However, the higher the resolution of an image displayed by a display apparatus, the larger the amount of signals of each frame outputted when a personal computer (PC) transmits the image to the display apparatus, and accordingly the larger the transmission bandwidth required.

BRIEF SUMMARY

Accordingly, one example of the present disclosure is an image processing method of virtual reality. The image processing method may include obtaining position information of a gaze point, the position information of the gaze point being position information of a gaze point of a user's eye on an original image; performing a compression process on the original image to obtain a compressed image based on the position information of the gaze point; performing a compression process on a distorted image of the original image in an lens to obtain a compressed distorted image based on the position information of the gaze point; and performing an anti-distortion process on the compressed image to obtain an anti-distortion image based on a relationship between the compressed image and the compressed distorted image.

Performing the compression process on the original image to obtain the compressed image based on the position information of the gaze point may include dividing the original image into a high-resolution display region and non-high-resolution display regions based on the position information of the gaze point, the gaze point being in the high-resolution display region; and compressing the original image to obtain the compressed image. The non-high-resolution display regions may be compressed at a higher ratio than the high-resolution display region.

Dividing the original image into the high-resolution display region and the non-high-resolution display regions based on the position information of the gaze point may include determining the high-resolution display region with the gaze point as a center of the high-resolution display region in the original image, the high-resolution display region being a region of a rectangular shape; and determining eight non-high-resolution display regions based on positions of four vertexes of the high-resolution display region in the original image, wherein the eight non-high-resolution display regions are respectively located above the high-resolution display region, below the high-resolution display region, and at a left side, a right side, a upper left side, a upper right side, a lower left side, and a lower right side of the high-resolution display region.

Compressing the original image to obtain the compressed image may include performing a compression process on abscissas of pixel points in the non-high-resolution display regions above and below the high-resolution display region, and an area of each of the non-high-resolution display regions located right above and right below the high-resolution display region being compressed r times respectively; performing a compression process on ordinates of pixel points in the non-high-resolution display regions at the left side and the right side of the high-resolution display region respectively, and an area of each of the non-high-resolution display regions at the left side and the right side of the high-resolution display region being compressed r times respectively; and performing a compression process on ordinates and abscissas of pixel points in the non-high-resolution display regions at the upper left side, the lower right side, the upper right side, and the lower right side of the high-resolution display regions respectively, and an area of each of the non-high-resolution display regions at the upper left side, the lower right side, the upper right side, and the lower right side of the high-resolution display region being compressed r2 times. r is a compression coefficient. No compression process may be performed on the high-resolution display region.

Performing a compression process on a distorted image of the original image in an lens to obtain a compressed distorted image based on the position information of the gaze point may include dividing the distorted image into a high-resolution distorted display region and non-high-resolution distorted display regions based on the position information of the gaze point, the gaze point being in the high-resolution distorted display region; and compressing the distorted image to obtain the compressed distorted image, wherein the non-high-resolution distorted display regions are compressed at a higher ratio that the high-resolution distorted display region.

Dividing the distorted image into a high-resolution distorted display region and non-high-resolution distorted display regions based on the position information of the gaze point may include determining the high-resolution distorted display region with the gaze point as a center of the high-resolution distorted display region in the distortion image, the high-resolution distorted display region being a region of a rectangular shape; and determining eight non-high-resolution distorted display regions based on positions of four vertexes of the high-resolution distorted display region in the original image, wherein the eight non-high-resolution distorted display regions are respectively located above the high-resolution distorted display region, below the high-resolution distorted display region, and at a left side, a right side, a upper left side, a upper right side, a lower left side, and a lower right side of the high-resolution distorted display region.

Compressing the distorted image to obtain the compressed distorted image may include performing a compression process on abscissas of pixel points in the non-high-resolution distorted display regions above and below the high-resolution distorted display region, and an area of each of the non-high-resolution distorted display regions located right above and right below the high-resolution distorted display region being compressed r times respectively; performing a compression process on ordinates of pixel points in the non-high-resolution distorted display regions at the left side and the right side of the high-resolution distorted display region respectively, and an area of each of the non-high-resolution distorted display regions at the left side and the right side of the high-resolution distorted display region being compressed r times respectively; and performing a compression process on ordinates and abscissas of pixel points in the non-high-resolution distorted display regions at the upper left side, the lower right side, the upper right side, and the lower right side of the high-resolution distorted display regions respectively, and an area of each of the non-high-resolution distorted display regions at the upper left side, the lower right side, the upper right side, and the lower right side of the high-resolution distorted display region being compressed r2 times. r is a compression coefficient. No compression process may be performed on the high-resolution distorted display region.

Compressing the distorted image to obtain the compressed distorted image may include determining a region where a pixel point is located in the original image. Ff the pixel point is in the non-high-resolution display region at the upper left side of the high-resolution display region, a distortion abscissa of the pixel point is $XQ''=XR'-(XR'-XQ')/r$, and a distortion ordinate of the pixel point is $YQ''=YT'+(YQ'-YT')/r$. If the pixel point is in the non-high-resolution display region at above the high-resolution display region, a distortion abscissa of the pixel point is $XQ''=XQ'$, and a distortion ordinate of the pixel point is $YQ''=YT'+(YQ'-YT')/r$. If the pixel point is in the non-high-resolution display region at the upper right side of the high-resolution display region, a distortion abscissa of the pixel point is $XQ''=XR'+(XQ'-XR')/r$, and a distortion ordinate of the pixel point is $YQ''=YT'+(YQ'-YT')/r$. If the pixel point is in the non-high-resolution display region at the left side of the high-resolution display region, a distortion abscissa of the pixel point is $XQ''=XR'-(XR'-XQ')/r$, and a distortion ordinate of the pixel point is $YQ''=YQ'$. If the pixel point is in the high-resolution display region, a distortion abscissa of the pixel point is $XQ''=XQ'$, and a distortion ordinate of the pixel point is $YQ''=YQ'$. If the pixel point is in the non-high-resolution display region at the right side of the high-resolution display region, a distortion abscissa of the pixel point is $XQ''=XR'+(XQ'-XR')/r$, and a distortion ordinate of the pixel point is $YQ''=YQ$. If the pixel point is in the non-high-resolution display region at the lower left side of the high-resolution display region, a distortion abscissa of the pixel point is $XQ''=XR'-(XR'-XQ')/r$, and a distortion ordinate of the pixel point is $YQ''=YT'-(YT'-YQ')/r$. If the pixel point is in the non-high-resolution display region below the high-resolution display region, a distortion abscissa of the pixel point is $XQ''=XQ'$, and a distortion ordinate of the pixel point is $YQ''=YT'-(YT'-YQ')/r$. If the pixel point is in the non-high-resolution display region at the lower right side of the high-resolution display region, a distortion abscissa of the pixel point is $XQ''=XR'+(XQ'-XR')/r$, and a distortion ordinate of the pixel point is $YQ''=YT'-(YT'-YQ')/r$. Q is the pixel point, Q" is a corresponding pixel point of Q in the distorted image, Q' is a corresponding pixel point of Q obtained through the lens, XQ" is a abscissa of Q", YQ" is a ordinate of Q", XQ' is an abscissa of Q', and YQ' is an ordinate of Q'. R and T are reference points of Q in the original image, an abscissa of R is the same as that of Q in the original image, an ordinate of T is the same as that of Q in the original image, XR' is an abscissa of R obtained through the lens, and YT' is an ordinate of T obtained through the lens.

Determining the region where the pixel point is located in the original image may include determining position information of the pixel point in the original image and comparing the position information of the pixel point in the original image with position information of the four vertexes of the high-resolution display region to determine the region where the pixel point is located in the original image. Obtaining the position information of the gaze point may include obtaining the position information of the gaze point according to an eyeball tracking algorithm.

The image processing method may further include flattening and displaying the anti-distortion image. Flattening the anti-distortion image may include performing a expansion process on abscissas of pixel points in the non-high-resolution display regions above and below the high-resolution display region, and an area of each of the non-high-resolution display regions located right above and right below the high-resolution display region being expanded r times respectively; performing a expansion process on ordinates of pixel points in the non-high-resolution display regions at the left side and the right side of the high-resolution display region respectively, and an area of each of the non-high-resolution display regions at the left side and the right side of the high-resolution display region being expanded r times respectively; and performing a expansion process on ordinates and abscissas of pixel points in the non-high-resolution display regions at the upper left side, the lower right side, the upper right side, and the lower right side of the high-resolution display regions respectively, and an area of each of the non-high-resolution display regions at the upper left side, the lower right side, the upper right side, and the lower right side of the high-resolution display region being expanded r2 times. r is the compression coefficient.

Another example of the present disclosure is an image processing apparatus of virtual reality. The image processing apparatus of virtual reality may include a processor, and the processor may be configured to perform the image processing method according to one embodiment of the present disclosure.

Another example of the present disclosure is a virtual display device. The virtual display device may include a VR display; and the image processing apparatus according to one embodiment of the present disclosure. The image processing apparatus may deliver the anti-distortion image to the VR display, and the VR display may flatten the anti-distortion image to obtain a display image and display the display image.

Another example of the present disclosure is a computer readable storage medium storing computer program instructions, wherein the computer program instructions may be configured to be executed by a processor to implement the method according to one embodiment of the present disclosure.

BRIEF DESCRIPTION OF THE DRAWINGS

The subject matter which is regarded as the invention is particularly pointed out and distinctly chimed in the claims at the conclusion of the specification. The foregoing and other objects, features, and advantages of the invention are apparent from the following detailed description taken in conjunction with the accompanying drawings in which:

DETAILED DESCRIPTION

Figure 1:
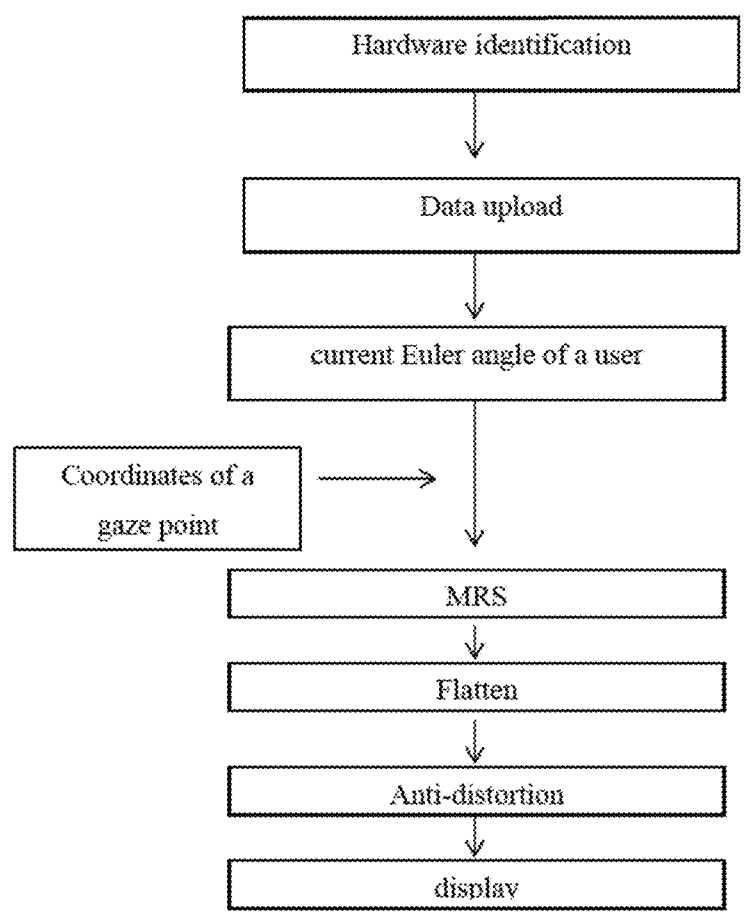
FIG. 1 is a flow diagram of an image processing method in the prior art.

The present disclosure will be described in further detail with reference to the accompanying drawings and embodiments in order to provide a better understanding by those skilled in the art of the technical solutions of the present disclosure. Throughout the description of the disclosure, reference is made to FIGS. 1-10. When referring to the figures, like structures and elements shown throughout are indicated with like reference numerals. The described embodiments are part of the embodiments of the present disclosure, and are not all possible embodiments. According to the embodiments of the present disclosure, all other embodiments obtained by persons of ordinary skill in the art without creative efforts, belong to the protection scope of the disclosure.

In the description of the present disclosure, the meaning of "plural" is two or more unless otherwise specifically and specifically defined.

In the description of the specification, references made to the term "one embodiment," "some embodiments," and "exemplary embodiments," "example," and "specific example," or "some examples" and the like are intended to refer that specific features and structures, materials or characteristics described in connection with the embodiment or example that are included in at least one embodiment or example of the present disclosure. The schematic expression of the terms does not necessarily refer to the same embodiment or example. Moreover, the specific features, structures, materials or characteristics described may be included in any suitable manner in any one or more embodiments or examples. The embodiments in the disclosure and the features in the embodiments can be combined with each other when there is no conflict.

FIG. 1 is a flow diagram of an image processing method in the prior art. As shown in FIG. 1, the image processing method in a current VR system is as follows: after the hardware is identified correctly and data from a gyroscope is uploaded and processed, a current Euler angle of a user is calculated. Then, Multi-Resolution-Shading (MRS) is carried out based on coordinates of a gaze point. Taking a target resolution of 4k4k of a single-eye as an example, a resolution of an image of the single-eye after MRS is 2k2k. Then, after a flattening process, an image of the single-eye with a resolution of 4k4k is obtained. Then, after an anti-distortion process, the image of the single-eye is outputted to the display apparatus for displaying.

According to the above image processing method, the higher the resolution of the image displayed by the display apparatus, the higher the requirement of the transmission bandwidth when the image is transmitted by a personal computer (PC) terminal.

In view of the above deficiencies, an image processing method of virtual reality is provided according to one embodiment of the present disclosure. A display apparatus provided with the image processing method can display high-resolution images without the need of increasing transmission bandwidths.

The present disclosure will be described in detail below with reference to the accompanying drawings together with embodiments.

Figure 2:
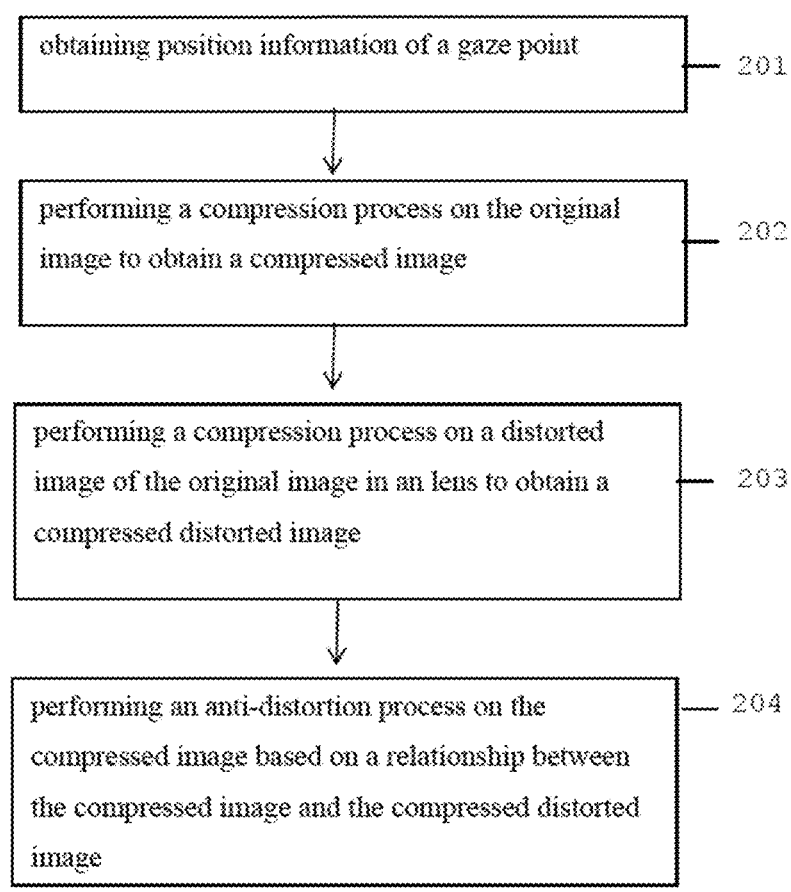
FIG. 2 is a flow diagram of an image processing method of virtual reality according to an embodiment of the present disclosure.

An image processing method of virtual reality is provided according to one embodiment of the present disclosure. As shown in FIG. 2, the image processing method includes the following steps:

In step 201, position information of a gaze point is obtained. The position information of the gaze point is position information of a gaze point of a user's eye on an original image.

In one embodiment, the position information of the gaze point is obtained according to an eyeball tracking algorithm. The position information of the gaze point is the position information of the gaze point of the user's eye on the original image, that is, the coordinates.

In step 202, a compression process is performed on the original image based on the position information of the gaze point to obtain a compressed image.

In one embodiment, step 202 is implemented according to the below embodiment, but not limited to, as follows.

First, the original image is divided into a high-resolution display region and non-high-resolution display regions based on the position information of the gaze point. The gaze point is located in the high-resolution display region.

In one embodiment according to the position information of the gaze point, the high-resolution display region in the original image is determined by taking the gaze point as a center of the high-resolution display region. The high-resolution display region may be a region of a square shape. Eight non-high-resolution display regions are determined based on the positions of four vertexes of the high-definition display region in the original image, and they are respectively located right above the high-definition display region, right below the high-definition display region, at the left side of the high-definition display region, at the right side of the high-definition display region, at the upper left side, the upper right side, the lower left side, and the lower right side of the high-definition display region, respectively.

Figure 3:
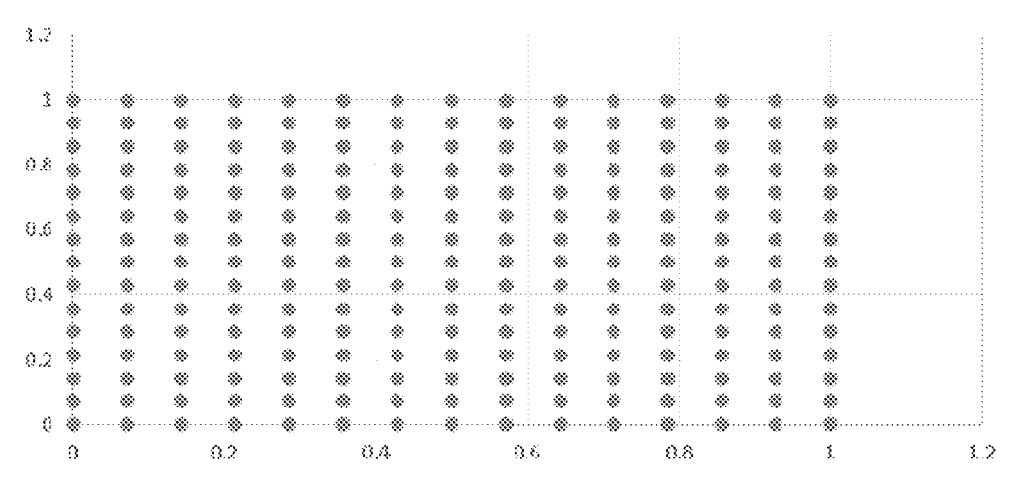
FIG. 3 is a schematic diagram of grid scattered points of an original image.
Figure 4:
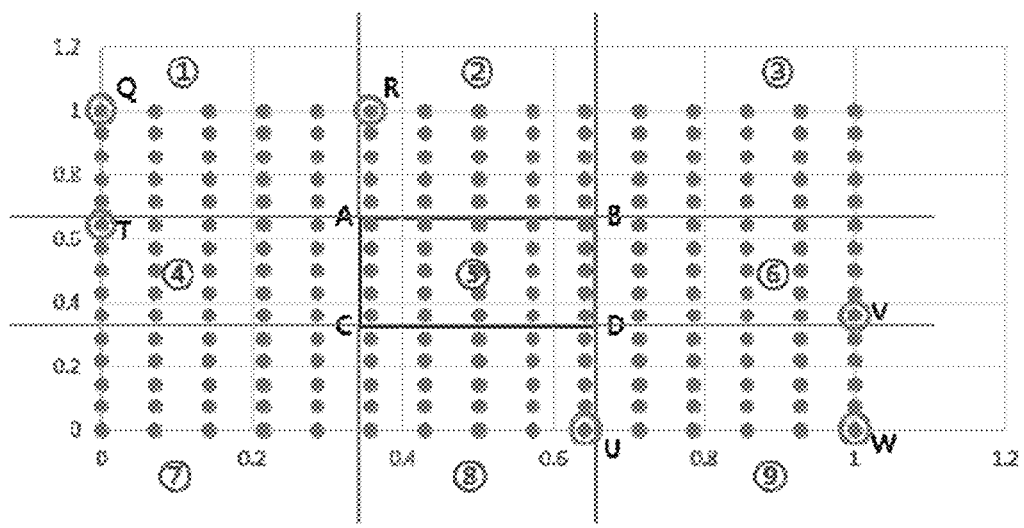
FIG. 4 is a schematic diagram of grid scattered points of an original image being divided into nine regions according to an embodiment of the present disclosure.

FIG. 3 shows a schematic diagram of grid scattered points of an original image. FIG. 4 shows a schematic diagram of grid scattered points of the original image being divided into nine regions. After the coordinates of the gaze point in FIG. 3 are determined, a high-resolution display region having the gaze point as the center is determined in the original image. That is region ⑤ in FIG. 4. Then, according to the positions of the four vertexes A, B, C, and D of region ⑤, eight high-resolution display regions are determined, and they are respectively located right above the high-resolution display region, right below the high-resolution display region, at the left side, the right side, the upper left side, the upper right side, the lower left side, and the lower right side of the high-resolution display region. That is, region ①（upper left side), region ② (right above), region ③ (upper right side), region ④ (right above), region ⑥ (right side), region ⑦ (lower left side), region ⑧ (right below), region ⑨ (lower right side).

In one embodiment of the present disclosure, the original image is divided into nine regions based on the position of the gaze point. As the position of the gaze point changes, the positions of the nine regions also change correspondingly. The positions of the nine divided regions as shown in FIG. 4 are only one of the possible ways of the division.

In addition, when determining the regions based on the position of the gaze point, a percentage of an area of the high-resolution region, region @, in the original image is not less than 30%.

Second, the original image is subjected to a compression process to obtain a compressed or distorted image. During the compression process, the high-resolution display region is not compressed, and the non-high-resolution display regions are compressed.

In one embodiment, the principle of the compression is, but not limited to, as follows:

Ordinates of pixel points in the non-high-resolution display regions right above and below the high-resolution display region are subjected to a compression process. In one embodiment, the non-high-resolution display regions located right above and below the high-resolution display region are compressed r times respectively.

Abscissas of pixel points in the non-high-resolution display regions on the left side and the right side of the high-resolution display region are subjected to a compression process. In one embodiment, the non-high-resolution display regions located on the left side and the right side of the high-resolution display region are compressed r times respectively.

Ordinates and abscissas of pixel points in the non-high-resolution display regions located at the upper left side, the lower right side, the upper right side, and the lower right side of the high-resolution display region are subjected to a compression process respectively. In one embodiment, the non-high-resolution display regions located at the upper left side, the lower right side, the upper right side, and the lower right side of the high-resolution display regions are compressed r2 times respectively.

The term r is a preset compression coefficient.

Taking FIG. 4 as an example, different regions are compressed correspondingly as follows:

Region ①: both a distortion ordinate and a distortion abscissa are subjected to a compression process, and the region is compressed $r^2$ times;

Region ②: a distortion abscissa is subjected to a compression process, and the region is compressed r times;

Region ③: both a distortion ordinate and a distortion abscissa are subjected to a compression process, and the region is compressed r times;

Region ④: a distortion ordinate is subjected to a compression process, and the region is compressed r times;

Region ⑤: not subjected to a compression process;

Region ⑥: a distortion ordinate is subjected to a compression process, and the region is compressed r times;

Region ⑦: both a distortion ordinate and a distortion abscissa are subjected to a compression process, and the region is compressed $r^2$ times;

Region ⑧: a distortion abscissa is subjected to a compression process, and the region is compressed r times; and Region ⑨: both a distortion ordinate and a distortion abscissa are subjected to a compression process, and the region is compressed $r^2$ times.

According to the above compression principle, the original image is subjected to the compression process.

Figure 5:
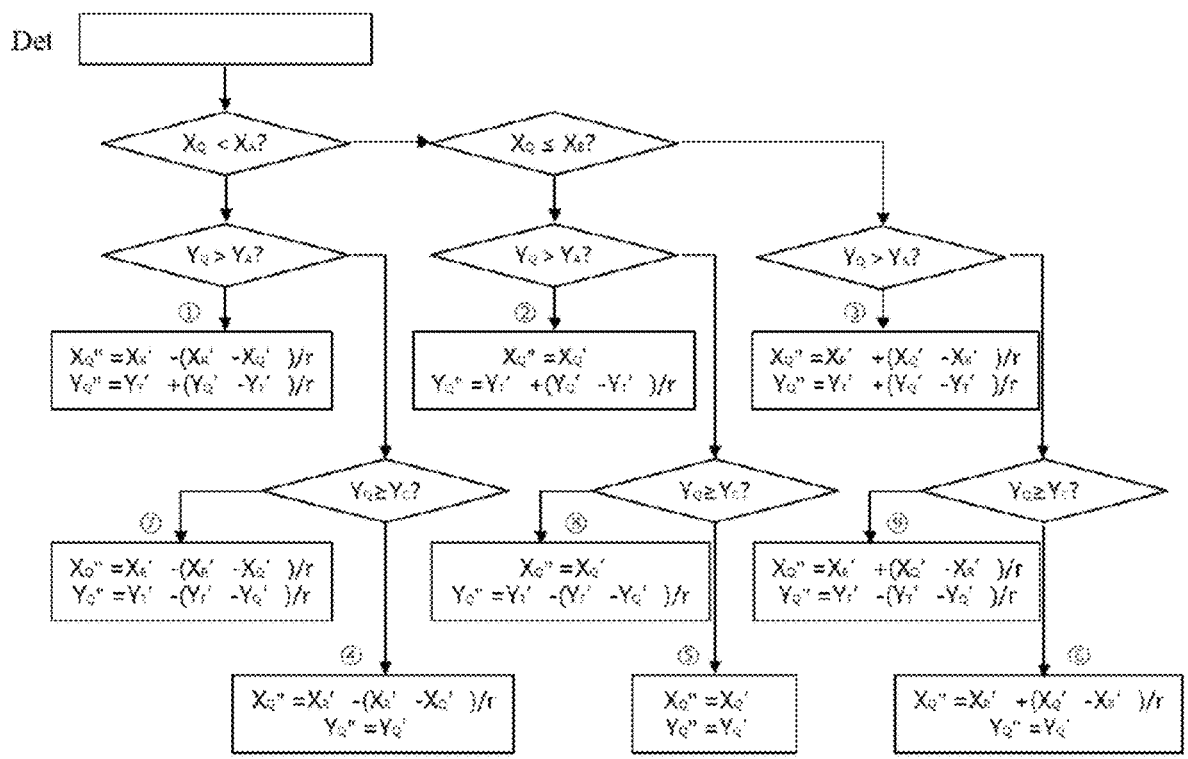
FIG. 5 is a schematic diagram of determining coordinates of a point when an original image is subjected to a compression process according to one embodiment of the present disclosure.

FIG. 5 shows a process of determining coordinates of a point when the original image is subjected to a compression process. The process includes the following:

The following steps are performed for every pixel point in the original image.

First, a region where a pixel point is located in an original image is determined.

Specifically, position information of the pixel point in the original image is determined. The position information of the pixel point in the original image is compared with the position information of the four vertexes of the high-resolution display region to determine the region where the pixel point is located in the original image.

Taking FIG. 4 as an example, a pixel point is represented by Q:

When $X_Q<X_A$, $Y_Q>Y_A$; Q is located in region ①.
When $X_A \leq X_Q \leq X_B$, $Y_Q>Y_A$, Q is located in region ②.
When $X_Q>X_B$, $Y_Q>Y_A$, Q is located in region ③.
When $X_Q<X_A$, $Y_C \leq Y_Q \leq Y_A$, Q is located in region ④.
When $X_A \leq X_Q \leq X_B$, $Y_C \leq Y_Q \leq Y_A$, Q is located in region ⑤.
When $X_Q>X_B$, $Y_C \leq Y_Q \leq Y_A$, Q is located in region ⑥.
When $X_Q<X_A$, $Y_Q<Y_C$, Q is located in region ⑦.
When $X_A \leq X_Q \leq X_B$, $Y_Q<Y_C$, Q is located in Region ⑧.
When $X_Q>X_B$, $Y_Q<Y_C$, Q is located in Region ⑨.

When the pixel point is located in region ①, the distortion abscissa of the pixel point is $X_{Q''}=X_R-(X_R-X_{Q'})/r$, and the distortion ordinate of the pixel point is $Y_{Q''}=Y_T+(Y_{Q'}-Y_T)/r$.

When the pixel point is located in region ②, the distortion abscissa of the pixel point is $X_{Q''}=X_{Q'}$, and the distortion ordinate of the pixel point is $Y_{Q''}=Y_T+(Y_{Q'}-Y_T)/r$.

When the pixel point is located in region ③, the distortion abscissa of the pixel point is $X_{Q''}=X_R+(X_{Q'}-X_R)/r$, and the distortion ordinate of the pixel point is $Y_{Q''}=Y_T+(Y_{Q'}-Y_T)/r$.

When the pixel point is located in region ④, the distortion abscissa of the pixel point is $X_{Q''}=X_R-(X_R-X_{Q'})/r$, and the distortion ordinate of the pixel point is $Y_{Q''}=Y_{Q'}$.

When the pixel point is located in region ⑤, the distortion abscissa of the pixel point is $X_{Q''}=X_{Q'}$, and the distortion ordinate of the pixel point is $Y_{Q''}=Y_{Q'}$.

When the pixel point is located in region ⑥, the distortion abscissa of the pixel point is $X_{Q''}=X_R+(X_{Q'}-X_R)/r$, and the distortion ordinate of the pixel point is $Y_{Q''}=Y_{Q'}$.

When the pixel point is located in region ⑦, the distortion abscissa of the pixel point is $X_{Q''}=X_R+(X_R-X_{Q'})/r$, and the distortion ordinate of the pixel point is $Y_{Q''}=Y_T-(Y_T-Y_{Q'})/r$.

When the pixel point is located in region ⑧, the distortion abscissa of the pixel point is $X_{Q''}=X_{Q'}$, and the distortion ordinate of the pixel point is $Y_{Q''}=Y_T-(Y_T-Y_{Q'})/r$.

When the pixel point is located in region ⑨, the distortion abscissa of the pixel point is $X_{Q''}=X_R+(X_{Q'}-X_R)/r$, and the distortion ordinate of the pixel point is $Y_{Q''}=Y_T-(Y_T-Y_{Q'})/r$.

Q is the pixel point, $X_{Q''}$ is a distortion abscissa of Q in a distorted image. $Y_{Q''}$ is a distortion ordinate of Q in the distorted image. $X_{Q'}$ is an abscissa of the pre-determined Q obtained through a lens. $Y_{Q'}$ is the ordinate of the pre-determined Q obtained through the lens.

R and T are reference points of Q in the original image. The abscissa of R is the same as that of Q in the original image. The ordinate of T is the same as that of Q in the original image. $X_{R'}$ is an abscissa of the pre-determined R obtained through the lens. $Y_{T'}$ is an ordinate of the pre-determined T obtained through the lens.

Each of the pixel points in the original image has reference points thereof. For example, as shown in FIG. 4, the reference points of W in region ⑨ are U and V. The ordinates of W and U in the original image are the same. The abscissas of W and V in the original image are the same.

Figure 6A:
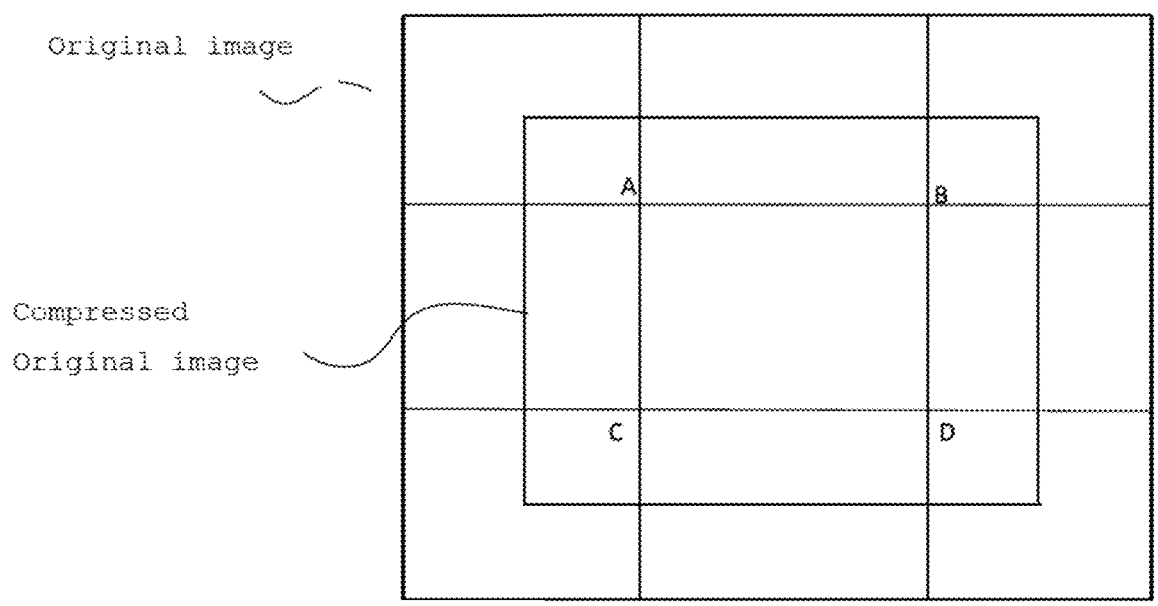
FIG. 6A is a schematic diagram of an original image and a compressed image according to one embodiment of the present disclosure.
Figure 6B:
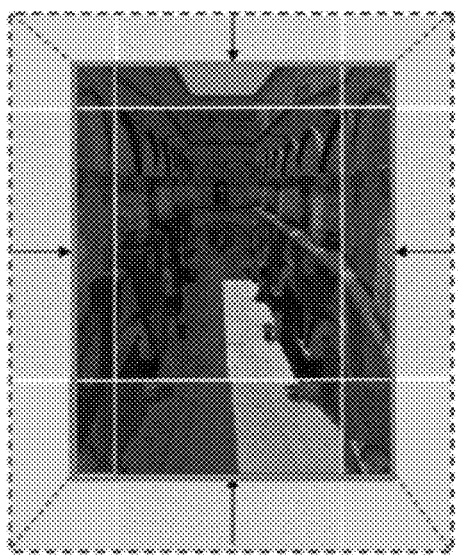
FIG. 6B is shows an original image and a compressed image according to one embodiment of the present disclosure.

FIG. 6a shows a schematic diagram of an original image and a compressed image according to one embodiment of the present disclosure. FIG. 6b is shows an original image and a compressed image according to one embodiment of the present disclosure.

In step 203, a compression process is performed on a distorted image of the original image in an lens to obtain a compressed distorted image based on the position information of the gaze point.

Figure 7:
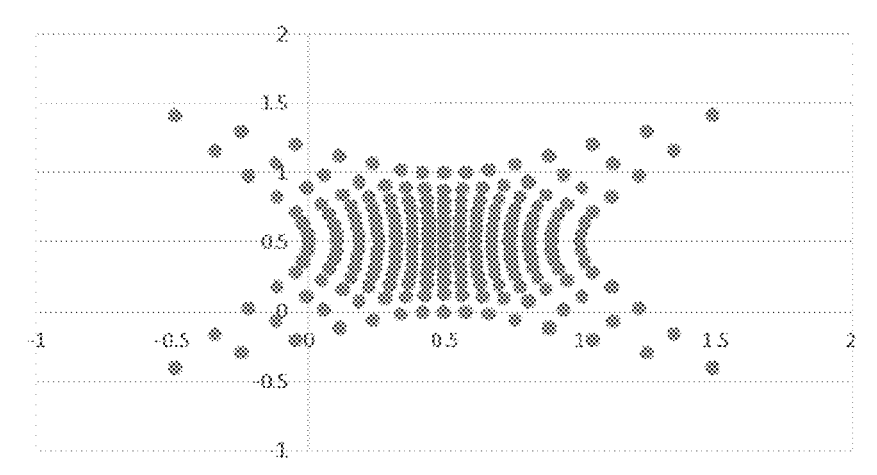
FIG. 7 is a schematic diagram of a distorted image of an original image being viewed through a lens according to an embodiment of the present disclosure.
Figure 8:
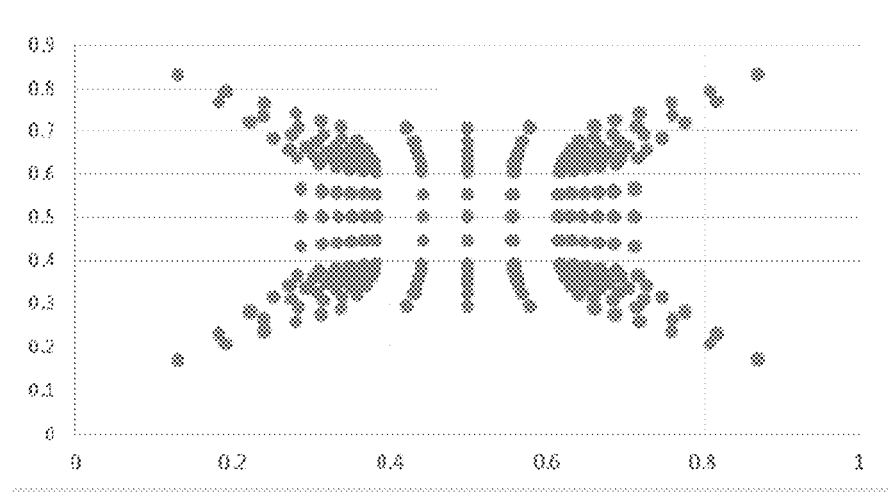
FIG. 8 is a schematic diagram of a compressed distorted image obtained after an compression process according to an embodiment of the present disclosure.

, FIG. 7 is a schematic diagram of a distortion image of an original image being viewed through a lens according to one embodiment of the present disclosure. $X_{Q'}$ is the abscissa of Q in the original image in FIG. 7. $Y_{Q'}$ is the ordinate of Q in the original image in FIG. 7. $X_{R'}$ is the abscissa of R in the original image in FIG. 7. $Y_{T'}$ is the ordinate of T in the original image in FIG. 7. These coordinates can be determined in advance according to the operating principle of the lens.

In one embodiment, performing a compression process on a distorted image of the original image in an lens to obtain a compressed distorted image based on the position information of the gaze point included dividing the distorted image into a high-resolution distorted display region and non-high-resolution distorted display regions based on the position information of the gaze point, the gaze point being in the high-resolution distorted display region and compressing the distorted image to obtain the compressed distorted image, wherein the non-high-resolution distorted display regions are compressed at a higher ratio that the high-resolution distorted display region.

Dividing the distorted image into a high-resolution distorted display region and non-high-resolution distorted display regions based on the position information of the gaze point may include determining the high-resolution distorted display region with the gaze point as a center of the high-resolution distorted display region in the distortion image, the high-resolution distorted display region being a region of a rectangular shape and determining eight non-high-resolution distorted display regions based on positions of four vertexes of the high-resolution distorted display region in the original image. The eight non-high-resolution distorted display regions may be respectively located above the high-resolution distorted display region, below the high-resolution distorted display region, and at a left side, a right side, a upper left side, a upper right side, a lower left side, and a lower right side of the high-resolution distorted display region.

Compressing the distorted image to obtain the compressed distorted image may further include performing a compression process on abscissas of pixel points in the non-high-resolution distorted display regions above and below the high-resolution distorted display region, and an area of each of the non-high-resolution distorted display regions located right above and right below the high-resolution distorted display region being compressed r times respectively, performing a compression process on ordinates of pixel points in the non-high-resolution distorted display regions at the left side and the right side of the high-resolution distorted display region respectively, and an area of each of the non-high-resolution distorted display regions at the left side and the right side of the high-resolution distorted display region being compressed r times respectively, and performing a compression process on ordinates and abscissas of pixel points in the non-high-resolution distorted display regions at the upper left side, the lower right side, the upper right side, and the lower right side of the high-resolution distorted display regions respectively, and an area of each of the non-high-resolution distorted display regions at the upper left side, the lower right side, the upper right side, and the lower right side of the high-resolution distorted display region being compressed $r^2$ times. r is a compression coefficient. No compression process is performed on the high-resolution distorted display region.

In one embodiment, compressing the distorted image to obtain the compressed distorted image may further include determining a region where a pixel point is located in the original image.

If the pixel point is in the non-high-resolution display region at the upper left side of the high-resolution display region, a distortion abscissa of the pixel point is $X_{Q''}=X_{R'}-(X_{R'}-X_{Q'})/r$, and a distortion ordinate of the pixel point is $Y_{Q''}=Y_{T'}+(Y_{Q'}-Y_{T'})/r$.

If the pixel point is in the non-high-resolution display region at above the high-resolution display region, a distortion abscissa of the pixel point is $X_{Q''}=X_{Q'}$, and a distortion ordinate of the pixel point is $Y_{Q''}=Y_{T'}+(Y_{Q'}-Y_{T'})/r$.

If the pixel point is in the non-high-resolution display region at the upper right side of the high-resolution display region, a distortion abscissa of the pixel point is $X_{Q''}=X_{R'}+(X_{Q'}-X_{R'})/r$, and a distortion ordinate of the pixel point is $Y_{Q''}=Y_{T'}+(Y_{Q'}-Y_{T'})/r$.

If the pixel point is in the non-high-resolution display region at the left side of the high-resolution display region, a distortion abscissa of the pixel point is $X_{Q''}=X_{R'}-(X_{R'}-X_{Q'})/r$, and a distortion ordinate of the pixel point is $Y_{Q''}=Y_{Q'}$.

If the pixel point is in the high-resolution display region, a distortion abscissa of the pixel point is $X_{Q''}=X_{Q'}$, and a distortion ordinate of the pixel point is $Y_{Q''}=Y_{Q'}$.

If the pixel point is in the non-high-resolution display region at the right side of the high-resolution display region, a distortion abscissa of the pixel point is $X_{Q''}=X_{R'}+(X_{Q'}-X_{R'})/r$, and a distortion ordinate of the pixel point is $Y_{Q''}=Y_{Q'}$.

If the pixel point is in the non-high-resolution display region at the lower left side of the high-resolution display region, a distortion abscissa of the pixel point is $X_{Q''}=X_{R'}-(X_{R'}-X_{Q'})/r$, and a distortion ordinate of the pixel point is $Y_{Q''}=Y_{T'}-(Y_{T'}-Y_{Q'})/r$.

If the pixel point is in the non-high-resolution display region below the high-resolution display region, a distortion abscissa of the pixel point is $X_{Q''}=X_{Q'}$, and a distortion ordinate of the pixel point is $Y_{Q''}=Y_{T'}-(Y_{T'}-Y_{Q'})/r$.

If the pixel point is in the non-high-resolution display region at the lower right side of the high-resolution display region, a distortion abscissa of the pixel point is $X_{Q''}=X_{R'}+(X_{Q'}-X_{R'})/r$, and a distortion ordinate of the pixel point is $Y_{Q''}=Y_{T'}-(Y_{T'}-Y_{Q'})/r$.

Q is the pixel point, Q" is a corresponding pixel point of Q in the distorted image, Q' is a corresponding pixel point of Q obtained through the lens. $X_{Q''}$ is a abscissa of Q". $Y_{Q''}$ is a ordinate of Q", $X_{Q'}$ is an abscissa of Q', and $Y_{Q'}$ is an ordinate of Q'. R and T are reference points of Q in the original image, an abscissa of R is the same as that of Q in the original image, an ordinate of T is the same as that of Q in the original image. $X_{R'}$ is an abscissa of R obtained through the lens, and $Y_{T'}$ is an ordinate of T obtained through the lens.

In one embodiment, determining the region where the pixel point is located in the original image includes determining position information of the pixel point in the original image and comparing the position information of the pixel point in the original image with position information of the four vertexes of the high-resolution display region to determine the region where the pixel point is located in the original image.

After the compression process is performed as mentioned above, a compressed image as shown in FIG. 8 can be obtained. As shown FIG. 8, the high-resolution display region where the gaze point is located does not change. However, the non-high-resolution display regions are compressed respectively to a different degree.

In step 204, an anti-distortion process is performed on the compressed image to obtain an anti-distortion image based on a relationship between the compressed image and the compressed distorted image.

In step 205, the anti-distortion image is flattened and displayed.

In one embodiment, flattening the anti-distortion image may include performing a expansion process on abscissas of pixel points in the non-high-resolution display regions above and below the high-resolution display region, and an area of each of the non-high-resolution display regions located right above and right below the high-resolution display region being expanded r times respectively, performing a expansion process on ordinates of pixel points in the non-high-resolution display regions at the left side and the right side of the high-resolution display region respectively, and an area of each of the non-high-resolution display regions at the left side and the right side of the high-resolution display region being expanded r times respectively, and performing a expansion process on ordinates and abscissas of pixel points in the non-high-resolution display regions at the upper left side, the lower right side, the upper right side, and the lower right side of the high-resolution display regions respectively, and an area of each of the non-high-resolution display regions at the upper left side, the lower right side, the upper right side, and the lower right side of the high-resolution display region being expanded $r^2$ times. r is the compression coefficient.

In one embodiment, the anti-distortion image is sent to a display apparatus, and the display apparatus is used for flattening and displaying the anti-distortion image.

In one embodiment, the display apparatus flattens and displays the anti-distortion image using a method of, but is not limited to, operating N rows at the same time. That is, each row of pixels in the anti-distortion image is flattened into N rows and then displayed, thereby reducing the amount of data processed by the display apparatus and the power consumption of the display apparatus. However, the method is not limited herein.

An image processing method of virtual reality is provided by one embodiment of the present disclosure. A compression process and an anti-distortion process are performed in sequence on the original image based on the acquired position information of the gaze point to obtain an anti-distortion image. Then, the anti-distortion image is sent to a display apparatus. The display apparatus flattens and displays the anti-distortion image. In the embodiment, the resolution of the anti-distortion image outputted by the PC terminal is relatively low. The display apparatus flattens the received anti-distortion image to obtain a high-resolution image and display the high-resolution image. Therefore, the display apparatus according to this embodiment of the present disclosure can display high-resolution images without the need of increasing the transmission bandwidth.

Figure 9:
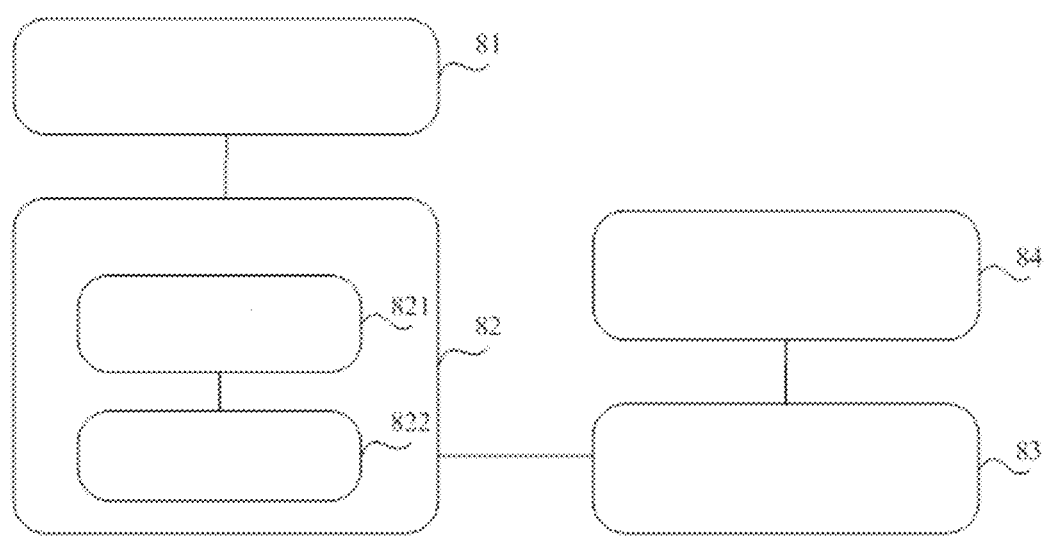
FIG. 9 is a schematic diagram of an image processing apparatus of virtual reality according to an embodiment of the present disclosure.

An image processing apparatus of virtual reality is provided according to one embodiment of the present disclosure. FIG. 9 shows a block diagram of the image processing apparatus of virtual reality, which includes the following according to one embodiment of the present disclosure:

An acquisition unit 81 acquiring position information of a gaze point is provided. The acquisition unit is used for acquiring the position information of the gaze point when the user wears the virtual reality apparatus. The position information of the gaze point is position information of the gaze point of a user's eye on a display screen of the virtual reality apparatus.

A compression unit 82 is provided. The compression unit 82 is used for compressing an original image based on the position information of the gaze point to obtain a distorted image.

An anti-distortion unit 83 is provided. The anti-distortion unit 83 is used for performing an anti-distortion process on the distorted image to obtain an anti-distortion image.

A flattening display unit 84 is provided. The flattening display unit 84 is used for flattening and displaying the anti-distortion image.

In one embodiment, the compression unit 82 specifically includes the following:

A division module 821, which is used for dividing the original image into a high-resolution display region and non-high-resolution display regions based on the position information of the gaze point. The gaze point is positioned in the high-resolution display region.

A compression module 822, which is used for compressing the original image to obtain a compressed image according to the compression principle that the part of the image in the high-resolution display region is not compressed, and the part of the image in the non-high-resolution display regions is compressed.

In one embodiment, the division module 821 is specifically used for performing the following:

Based on the position information of the gaze point, a high-resolution display region including the gaze point as the center thereof is determined in the original image. The high-resolution display region is a region of a square shape.

Eight non-high-resolution display regions are determined based on the positions of four vertexes of the high-resolution display region in the original image and respectively located right above the high-resolution display region, right below the high-resolution display region, at the left side of the high-resolution display region, at the right side of the high-resolution display region, and at the upper left side, the upper right side, the lower left side and the lower right side of the high-resolution display region respectively.

In one embodiment, the compression principle of the compression unit 82 specifically includes the following:

Abscissas of pixel points in the non-high-resolution display regions directly above and below the high-resolution display region are subjected to a compression process, and the non-high-resolution display regions located above and under the high-resolution display region are compressed by r times respectively.

Ordinates of pixel points in the non-high-resolution display regions directly on the left side of the high-resolution display region and the right side of the high-resolution display region are subjected to a compression process, and the non-high-resolution display regions located on the left side and the right side of the high-resolution display region are compressed r times respectively.

Ordinates and abscissas of pixel points in the non-high-resolution display regions located on the upper left side, the lower right side, the upper right side, and the lower right side of the high-resolution display regions are subjected to a compression process, and the non-high-resolution display regions located on the upper left side, the lower right side, the upper right side, and the lower right side of the high-resolution display region are compressed $r^2$ times respectively. The term r is a preset compression coefficient.

In one embodiment, the compression module 822 is specifically used for performing the following:

The following steps are performed for every pixel point in the original image:

A region where the pixel point is located in an original image is first determined.

If the pixel point is located in the non-high-resolution display region at the upper left side of the high-resolution display region, the distortion abscissa of the pixel point is $X_{Q''}=X_{R'}-(X_{R'}-X_{Q'})/r$, and the distortion ordinate of the pixel point is $Y_{Q''}=Y_{T'}+(Y_{Q'}-Y_{T'})/r$.

If the pixel point is located in the non-high-resolution display region at right above the high-resolution display region, the distortion abscissa of the pixel point is $X_{Q''}=X_{Q'}$, and the distortion ordinate of the pixel point is $Y_{Q''}=Y_{T'}+(Y_{Q'}-Y_{T'})/r$.

If the pixel point is located in the non-high-resolution display region at the upper right side of the high-resolution display region, the distortion abscissa of the pixel point is $X_{Q''}=X_{R'}+(X_{Q'}-X_{R'})/r$, and the distortion ordinate of the pixel point is $Y_{Q''}=Y_{T'}+(Y_{Q'}-Y_{T'})/r$.

If the pixel point is located in the non-high-resolution display region at the left side of the high-resolution display region, the distortion abscissa of the pixel point is $X_{Q''}=X_{R'}-(X_{R'}-X_{Q'})/r$, and the distortion ordinate of the pixel point is $Y_{Q''}=Y_{Q'}$.

If the pixel point is located in the high-resolution display region, the distortion abscissa of the pixel point is $X_{Q''}=X_{Q'}$, and the distortion ordinate of the pixel point is $Y_{Q''}=Y_{Q'}$.

If the pixel point is located in the non-high-resolution display region at the right side of the high-resolution display region, the distortion abscissa of the pixel point is $X_{Q''}=(X_{R'}-X_{Q'})/r$, and the distortion ordinate of the pixel point is $Y_{Q''}=Y_{Q'}$.

If the pixel point is located in the non-high-resolution display region at the lower left side of the high-resolution display region, the distortion abscissa of the pixel point is $X_{Q''}=X_{R'}-(X_{R'}-X_{Q'})/r$, and the distortion ordinate of the pixel point is $Y_{Q''}=Y_{T'}-(Y_{T'}-Y_{Q'})/r$.

If the pixel point is located in the non-high-resolution display region right below the high-resolution display region, the distortion abscissa of the pixel point is $X_{Q''}=X_{Q'}$, and the distortion ordinate of the pixel point is $Y_{Q''}=Y_{T'}-(Y_{T'}-Y_{Q'})/r$.

If the pixel point is located in the non-high-resolution display region at the lower right side of the high-resolution display region, the distortion abscissa of the pixel point is $X_{Q''}=X_{R'}+(X_{Q'}-X_{R'})/r$, and the distortion ordinate of the pixel point is $Y_{Q''}=Y_{T'}-(Y_{T'}-Y_{Q'})/r$.

Q is the pixel point, $X_{Q''}$ is a distortion abscissa of Q in a distorted image. $Y_{Q''}$ is a distortion ordinate of Q in the distorted image. $X_{Q'}$ is the abscissa of the pre-determined Q obtained through a lens. $Y_{Q'}$ is the ordinate of the pre-determined Q obtained through the lens.

R and T are reference points of Q in the original image. The abscissa of r is the same as that of Q in the original image. The ordinate of T is the same as that of Q in the original image. $X_{R'}$ is the abscissa of the pre-determined R obtained through the lens. $Y_{T'}$ is the ordinate of the pre-determined T obtained through the lens.

In one embodiment, the compression module 822, which determines the region where the pixel point is located in the original image, is specifically used for performing the following:

First, the position information of the pixel point in the original image is determined.

Then, the position information of the pixel point in the original image is compared with the position information of the four vertexes of the high-resolution display region to determine the region where the pixel point is located in the original image.

The subsystems or units loaded in the apparatus correspond to each of the steps described in the method with reference to FIGS. 2-8. Therefore, the operation and the characteristics described above in the method are also applicable to the apparatus and the units contained in the apparatus, and the description is not repeated herein.

Figure 10:
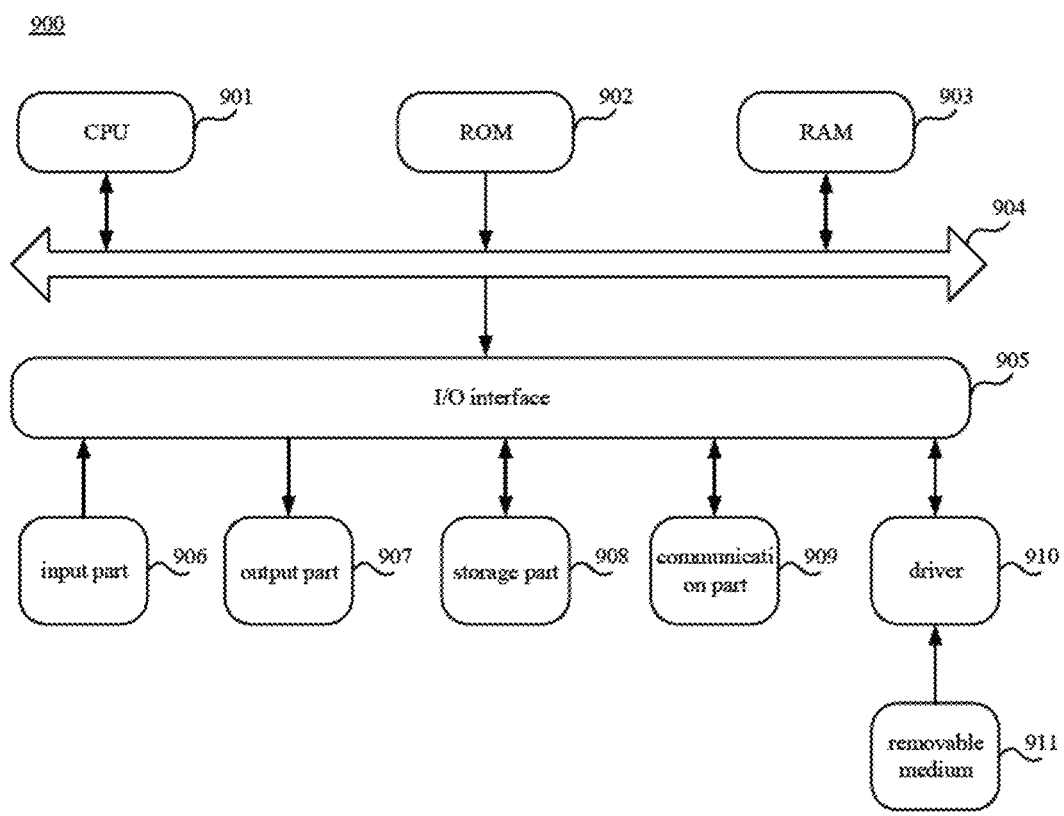
FIG. 10 is a schematic diagram of a virtual display system according to an embodiment of the present disclosure.

Based on the same concept, in one embodiment, a computer system is provided which is suitable for implementing the embodiment of the disclosure. FIG. 10 is a schematic diagram of a computer system 900 which is suitable for achieving the embodiment of the present disclosure.

As shown in FIG. 10, the computer system includes a Central Processing Unit (CPU) 901 which can execute various appropriate actions and processes according to the programs stored in a Read-Only Memory (ROM) or programs loaded from a storage part 908 to the Random Access Memory (RAM) 903. RAM 903 also stores various programs and data needed by the operation of the system 900. The CPU 901, the ROM 902 and the RAM 903 are electrically connected to each other through a bus 904. An input/output (I/O) interface 905 is also electrically connected to the bus 904.

The following components are electrically connected to the I/O interface 905: an input part 906 including a keyboard, a mouse, etc.; an output part 907 including a Cathode Ray Tube (CRT), a liquid crystal display (LCD), a loudspeaker, etc.; a storage part 908 including a hard disk and the like; and a communication part 909 including Local Area Network (LAN) card, a modem and network interface card and the like. The communication part 909 performs a communication process via a network such as an internet. A driver 910 is also electrically connected to the I/O interface 905 as needed. A removable medium 911, such as a magnetic disk, an optical disc, a magneto-optical disk, a semiconductor memory, and the like, is installed on the driver 910 according to need, and computer programs read from the above can be installed into the storage part 908 as needed.

In one embodiment, the embodiments according to the present disclosure as described above with reference to FIGS. 2-7 can be implemented as a computer software program. For example, embodiments of the present disclosure include a computer program product which includes a computer program tangibly embodied on a machine readable medium. The computer program includes program codes for executing the methods of FIGS. 2-7. In the embodiment, the computer program may be downloaded and installed from a network via the communication part 909, and/or may be installed from the removable medium 911.

Flow diagrams and block diagrams in the accompanying figures illustrate systems architectures, methods and operations of various embodiments of the present disclosure that can be implemented by computer program products according to the systems, functions, and operations. Each block in the flowchart or block diagram may represent a module, a program segment, or a portion of the code. The module, the program segment, or the portion of the code includes one or more executable instructions for achieving a specified logical function. In some alternative embodiments, functions noted in the blocks can also occur in an order different from the order shown in the figures. For example, two blocks represented in succession may, in fact, be executed substantially in parallel, and may sometimes be performed in the opposite order, which is determined according to the functions involved in the disclosure. Each block in the block diagrams and/or the flow diagrams, and a combination of the blocks in the block diagram and/or the flow diagram can be realized by executing specified functions or a special hardware-based system, or can be realized by a combination of special hardware and computer instructions.

Units or modules related to the embodiments of the present application can be implemented with software or hardware. The described units or modules may also be provided in a processor. The names of the units or modules do not constitute a limitation to themselves in some cases.

A computer readable storage medium is provided according to one embodiment of the present disclosure. In one embodiment, the computer readable storage medium may be a computer readable storage medium contained in the apparatus in the above embodiment. In another embodiment, the computer readable storage medium exists independently and is not assembled to the computer. The computer readable storage medium stores one or more programs. The program is used by one or more processors to execute the formulas input method described in the current disclosure.

Another example of the present disclosure is a virtual display device. The virtual display device may include a VR display and the image processing apparatus according to one embodiment of the present disclosure. The image processing apparatus delivers the anti-distortion image to the VR display, and the VR display flattens the anti-distortion image to obtain a display image and display the display image The principle and the embodiment of the disclosure are set forth in the specification. The description of the embodiments of the present disclosure is only used to help understand the method of the present disclosure and the core idea thereof. Meanwhile, for a person of ordinary skill in the art, the disclosure relates to the scope of the disclosure, and the technical embodiment is not limited to the specific combination of the technical features, and also should covered other technical embodiments which are formed by combining the technical features or the equivalent features of the technical features without departing from the inventive concept. For example, technical embodiments may be obtained by replacing the features described above as disclosed in this disclosure (but not limited to) with similar features.

What is claimed is:

1. An image processing method of virtual reality, comprising:
obtaining position information of a gaze point, the position information of the gaze point being position information of a gaze point of a user's eye on an original image;
performing a compression process on the original image to obtain a compressed image based on the position information of the gaze point;
performing a compression process on a distorted image of the original image in an lens to obtain a compressed distorted image based on the position information of the gaze point; and
performing an anti-distortion process on the compressed image to obtain an anti-distortion image based on a relationship between the compressed image and the compressed distorted image;
wherein performing the compression process on the original image to obtain the compressed image based on the position information of the gaze point comprises:
dividing the original image into a high-resolution display region and non-high-resolution display regions based on the position information of the gaze point, the gaze point being in the high-resolution display region; and
compressing the original image to obtain the compressed image, wherein the non-high-resolution display regions are compressed at a higher ratio than the high-resolution display region;
wherein compressing the original image to obtain the compressed image comprises:
performing a compression process on abscissas of pixel points in the non-high-resolution display regions above and below the high-resolution display region, and an area of each of the non-high-resolution display regions located right above and right below the high-resolution display region being compressed r times respectively;
performing a compression process on ordinates of pixel points in the non-high-resolution display regions at the left side and the right side of the high-resolution display region respectively, and an area of each of the non-high-resolution display regions at the left side and the right side of the high-resolution display region being compressed r times respectively; and
performing a compression process on ordinates and abscissas of pixel points in the non-high-resolution display regions at the upper left side, the lower right side, the upper right side, and the lower right side of the high-resolution display regions respectively, and an area of each of the non-high-resolution display regions at the upper left side, the lower right side, the upper right side, and the lower right side of the high-resolution display region being compressed r2 times, wherein r is a compression coefficient.

2. The method according to claim 1, wherein dividing the original image into the high-resolution display region and the non-high-resolution display regions based on the position information of the gaze point comprises:
determining the high-resolution display region with the gaze point as a center of the high-resolution display region in the original image, the high-resolution display region being a region of a rectangular shape;
determining eight non-high-resolution display regions based on positions of four vertexes of the high-resolution display region in the original image, wherein the eight non-high-resolution display regions are respectively located above the high-resolution display region, below the high-resolution display region, and at a left side, a right side, a upper left side, a upper right side, a lower left side, and a lower right side of the high-resolution display region.

3. The method according to claim 1, wherein no compression process is performed on the high-resolution display region.

4. The method according to claim 1, wherein performing the compression process on the distorted image of the original image in the lens to obtain the compressed distorted image based on the position information of the gaze point comprises:
dividing the distorted image into a high-resolution distorted display region and non-high-resolution distorted display regions based on the position information of the gaze point, the gaze point being in the high-resolution distorted display region; and compressing the distorted image to obtain the compressed distorted image, wherein the non-high-resolution distorted display regions are compressed at a higher ratio than the high-resolution distorted display region.

5. The method according to claim 4, wherein dividing the distorted image into a high-resolution distorted display region and non-high-resolution distorted display regions based on the position information of the gaze point comprises:
determining the high-resolution distorted display region with the gaze point as a center of the high-resolution distorted display region in the distortion image, the high-resolution distorted display region being a region of a rectangular shape;
determining eight non-high-resolution distorted display regions based on positions of four vertexes of the high-resolution distorted display region in the original image, wherein the eight non-high-resolution distorted display regions are respectively located above the high-resolution distorted display region, below the high-resolution distorted display region, and at a left side, a right side, a upper left side, a upper right side, a lower left side, and a lower right side of the high-resolution distorted display region.

6. The method according to claim 5, wherein compressing the distorted image to obtain the compressed distorted image further comprises:
performing a compression process on abscissas of pixel points in the non-high-resolution distorted display regions above and below the high-resolution distorted display region, and an area of each of the non-high-resolution distorted display regions located right above and right below the high-resolution distorted display region being compressed r times respectively;
performing a compression process on ordinates of pixel points in the non-high-resolution distorted display regions at the left side and the right side of the high-resolution distorted display region respectively, and an area of each of the non-high-resolution distorted display regions at the left side and the right side of the high-resolution distorted display region being compressed r times respectively; and
performing a compression process on ordinates and abscissas of pixel points in the non-high-resolution distorted display regions at the upper left side, the lower right side, the upper right side, and the lower right side of the high-resolution distorted display regions respectively, and an area of each of the non-high-resolution distorted display regions at the upper left side, the lower right side, the upper right side, and the lower right side of the high-resolution distorted display region being compressed $r^2$ times;
wherein r is a compression coefficient.

7. The method according to claim 5, wherein no compression process is performed on the high-resolution distorted display region.

8. The method according to claim 1, wherein compressing the distorted image to obtain the compressed distorted image further comprises:
determining a region where a pixel point is located in the original image; wherein if the pixel point is in the non-high-resolution display region at the upper left side of the high-resolution display region, a distortion abscissa of the pixel point is $X_{Q''}=X_{R'}-(X_{R'}-X_{Q'})/r$, and a distortion ordinate of the pixel point is $Y_{Q''}=Y_{T'}+(Y_{Q'}-Y_{T'})/r$;
if the pixel point is in the non-high-resolution display region at above the high-resolution display region, a distortion abscissa of the pixel point is $X_{Q''}=X_{Q'}$, and a distortion ordinate of the pixel point is $Y_{Q''}=Y_{T'}+(Y_{Q'}-Y_{T'})/r$;
if the pixel point is in the non-high-resolution display region at the upper right side of the high-resolution display region, a distortion abscissa of the pixel point is $X_{Q''}=X_{R'}+(X_{Q'}-X_{R'})/r$, and a distortion ordinate of the pixel point is $Y_{Q''}=Y_{T'}+(Y_{Q'}-Y_{T'})/r$;
if the pixel point is in the non-high-resolution display region at the left side of the high-resolution display region, a distortion abscissa of the pixel point is $X_{Q''}=X_{R'}-(X_{R'}-X_{Q'})/r$, and a distortion ordinate of the pixel point is $Y_{Q''}=Y_{Q'}$;
if the pixel point is in the high-resolution display region, a distortion abscissa of the pixel point is $X_{Q''}=X_{Q'}$, and a distortion ordinate of the pixel point is $Y_{Q''}=Y_{Q'}$;
if the pixel point is in the non-high-resolution display region at the right side of the high-resolution display region, a distortion abscissa of the pixel point is $X_{Q''}=X_{R'}+(X_{Q'}-X_{R'})/r$, and a distortion ordinate of the pixel point is $Y_{Q''}=Y_{Q'}$;
if the pixel point is in the non-high-resolution display region at the lower left side of the high-resolution display region, a distortion abscissa of the pixel point is $X_{Q''}=X_{R'}-(X_{R'}-X_{Q'})/r$, and a distortion ordinate of the pixel point is $Y_{Q''}=Y_{T'}-(Y_{T'}-Y_{Q'})/r$;
if the pixel point is in the non-high-resolution display region below the high-resolution display region, a distortion abscissa of the pixel point is $X_{Q''}=X_{Q'}$, and a distortion ordinate of the pixel point is $Y_{Q''}=Y_{T'}-(Y_{T'}-Y_{Q'})/r$; and
if the pixel point is in the non-high-resolution display region at the lower right side of the high-resolution display region, a distortion abscissa of the pixel point is $X_{Q''}=X_{R'}+(X_{Q'}-X_{R'})/r$, and a distortion ordinate of the pixel point is $Y_{Q''}=Y_{T'}-(Y_{T'}-Y_{Q'})/r$;
wherein Q is the pixel point, Q" is a corresponding pixel point of Q in the distorted image, Q' is a corresponding pixel point of Q obtained through the lens, $X_{Q''}$ is a abscissa of Q", $Y_{Q''}$ is a ordinate of Q", $X_{Q'}$ is an abscissa of Q', and $Y_{Q'}$ is an ordinate of Q'; and
R and T are reference points of Q in the original image, an abscissa of R is the same as that of Q in the original image, an ordinate of T is the same as that of Q in the original image, $X_{R'}$ is an abscissa of R obtained through the lens, and $Y_{T'}$ is an ordinate of T obtained through the lens.

9. The method according to claim 8, wherein determining the region where the pixel point is located in the original image comprises:
determining position information of the pixel point in the original image; and
comparing the position information of the pixel point in the original image with position information of the four vertexes of the high-resolution display region to determine the region where the pixel point is located in the original image.

10. The method according to claim 1, wherein obtaining the position information of the gaze point comprises:
obtaining the position information of the gaze point according to an eyeball tracking algorithm.

11. The method according to claim 1, further comprising: flattening and displaying the anti-distortion image.

12. The method according to claim 11, wherein flattening the anti-distortion image comprises:
performing a expansion process on abscissas of pixel points in the non-high-resolution display regions above and below the high-resolution display region, and an area of each of the non-high-resolution display regions located right above and right below the high-resolution display region being expanded r times respectively;
performing a expansion process on ordinates of pixel points in the non-high-resolution display regions at the left side and the right side of the high-resolution display region respectively, and an area of each of the non-high-resolution display regions at the left side and the right side of the high-resolution display region being expanded r times respectively; and
performing a expansion process on ordinates and abscissas of pixel points in the non-high-resolution display regions at the upper left side, the lower right side, the upper right side, and the lower right side of the high-resolution display regions respectively, and an area of each of the non-high-resolution display regions at the upper left side, the lower right side, the upper right side, and the lower right side of the high-resolution display region being expanded $r^2$ times,
wherein r is the compression coefficient.

13. An image processing apparatus of virtual reality, comprising a processor, the processor is configured to perform the image processing method according to claim 1.

14. A virtual display device comprising:
a VR display; and
the image processing apparatus according to claim 13,
wherein the image processing apparatus delivers the anti-distortion image to the VR display, and the VR display flattens the anti-distortion image to obtain a display image and display the display image.

15. A non-transitory computer readable storage medium storing computer program instructions, wherein the computer program instructions are configured to be executed by a processor to implement the method according to claim 1.

* * * * *